United States Patent
Hanawa et al.

(10) Patent No.: US 8,515,569 B2
(45) Date of Patent: Aug. 20, 2013

(54) WORK SUPPORT SYSTEM, WORK SUPPORT METHOD, AND STORAGE MEDIUM

(75) Inventors: Shinichirou Hanawa, Yokohama (JP); Hitomi Arai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/387,946

(22) PCT Filed: May 26, 2010

(86) PCT No.: PCT/JP2010/058881
§ 371 (c)(1),
(2), (4) Date: Jun. 4, 2012

(87) PCT Pub. No.: WO2011/048837
PCT Pub. Date: Apr. 28, 2011

(65) Prior Publication Data
US 2012/0239179 A1    Sep. 20, 2012

(30) Foreign Application Priority Data
Oct. 22, 2009  (JP) ................................. 2009-243643

(51) Int. Cl.
*G06F 19/00* (2011.01)
*G06F 17/00* (2006.01)
*G06Q 10/00* (2012.01)
*G06Q 40/00* (2012.01)
*G06Q 90/00* (2006.01)
*G01N 37/00* (2006.01)

(52) U.S. Cl.
USPC ........... 700/108; 700/109; 700/110; 700/111; 705/7.28; 705/301; 705/500; 702/81; 702/84

(58) Field of Classification Search
USPC ............ 700/108–111; 702/81, 84; 705/7.28, 705/301, 500
See application file for complete search history.

(56) References Cited

U.S. PATENT DOCUMENTS

| 5,918,219 | A  | * | 6/1999 | Isherwood ...................... 705/37 |
| 6,237,915 | B1 | * | 5/2001 | Ledet et al. ................... 273/236 |
| 6,397,202 | B1 | * | 5/2002 | Higgins et al. .................. 706/47 |
| 6,675,127 | B2 | * | 1/2004 | LaBlanc et al. ............... 702/181 |

(Continued)

FOREIGN PATENT DOCUMENTS

| JP | 7-296065    | 11/1995 |
| JP | 10-020985   | 1/1998  |
| JP | 2005-346274 | 12/2005 |
| JP | 2008-159039 | 7/2008  |

OTHER PUBLICATIONS

PCT International Search Report on application No. PCT/JP2010/058881 mailed Jul. 27, 2010; 1 page.

*Primary Examiner* — Ronald Hartman, Jr.
(74) *Attorney, Agent, or Firm* — Foley & Lardner LLP

(57) ABSTRACT

The content of an operating instruction to each worker in a manufacturing process is controlled in the following way based on a manufacturing direction to the worker and on manufacturing achievement, work proficiency, and the like of the worker for the manufacturing direction. A deviation between a manufacturing direction and manufacturing achievement is calculated. Manufacturing direction parameters acting as factors of the calculated deviation are specified for each product to be manufactured. The above information is stored in a deviation factor database. For a new manufacturing direction, manufacturing direction parameters therein are checked against the deviation factor database to determine alarm information to be given to a worker on a manufacturing line, and the determined alarm information is outputted.

4 Claims, 18 Drawing Sheets

(56) References Cited

U.S. PATENT DOCUMENTS

| | | | |
|---|---|---|---|
| 6,817,613 B2* | 11/2004 | Hasek | 273/256 |
| 6,944,622 B1* | 9/2005 | Mitchell et al. | 1/1 |
| 7,035,809 B2* | 4/2006 | Miller et al. | 705/7.23 |
| 7,069,266 B2* | 6/2006 | Calderaro et al. | 707/783 |
| 7,337,124 B2* | 2/2008 | Corral | 705/7.17 |
| 7,627,493 B1* | 12/2009 | Sarthi et al. | 705/7.22 |
| 7,818,250 B2* | 10/2010 | Allin et al. | 705/38 |
| 7,937,281 B2* | 5/2011 | Miller et al. | 705/7.12 |
| 2001/0049615 A1* | 12/2001 | Wong et al. | 705/8 |

* cited by examiner

DEVIATION FACTOR DATABASE

| | | | FLAG FOR OPTIMUM PARAMETER |
|---|---|---|---|
| ARTICLE ID | 1234 | 0.9 | 1 |
| ARTICLE GROUP | | | |
| WORK PROCEDURE | BBB | 0.2 | |
| WORK TIME | CCC | 0.9 | 1 |
| USER ID | DDD | 0.8 | 1 |
| WORK PROFICIENCY | EEE | 0.5 | |
| EQUIPMENT ID (LINE) | FFF | 0.4 | |
| TEMPERATURE (DEVIATION FROM ORDINARY TEMPERATURE) | 111 | 0.2 | |
| HUMIDITY (DEVIATION FROM ORDINARY HUMIDITY) | 222 | 0.5 | |
| ITEM X | 333 | 0.8 | |
| BRIGHTNESS | 444 | 0.2 | |
| NUMERICAL VALUE OF DEVIATION | 8 | – | |
| DEVIATION LEVEL | 2 | – | |

↑ CORRELATION COEFFICIENT

EXPLANATORY VARIABLE

DEPENDENT VARIABLE

ALARM LEVEL DATABASE

| DEVIATION LEVEL | 1 | 2 |
|---|---|---|
| SCREEN COLOR CHANGE | 1 | 1 |
| SCREEN BLINK | | |
| HELP | | |
| SOUND | | 1 |
| VIBRATION | | |

PROFICIENCY DATABASE

| USER ID | XXX | YYY |
|---|---|---|
| PROFICIENCY LEVEL | 001 | 002 |
| WORK PROCEDURE | AAA | BBB |

EDUCATION DATABASE 130

| WORK PROCEDURE | PROFICIENCY | EDUCATIONAL PROGRAM |
|---|---|---|
| AAA | 001 | ED001A |
| | 002 | ED002A |
| | 003 | ED003A |
| | ... | ... |
| BBB | 001 | ED001B |

NAVIGATION VERSION DATABASE 131

| WORK PROCEDURE | AAA | BBB | |
|---|---|---|---|
| SCREEN TRANSITION ID | 002 | 001 | |
| SCREEN DATA | 002.dat、... | 001.dat、... | ... |
| SOUND | 002m.dat、... | 001m.dat、... | |
| VIBRATION | 002v.dat、... | 001v.dat、... | |

OPERATING PRECAUTION DATABASE 132

| MANUFACTURING DIRECTION No. | 010 |
|---|---|
| ARTICLE ID | 1234 |
| WORK TIME | XXX |
| USER ID | YYY |
| ARTICLE GROUP | |
| SCREEN COLOR CHANGE | 1 |
| SCREEN BLINK | |
| HELP | |
| SOUND | 1 |
| VIBRATION | |

FIG. 10

REGRESSION FORMULA IS DERIVED BY USING DATA FOR 8 BATCHES OF MANUFACTURING DIRECTION PARAMETERS — 500

| MANUFACTURING DIRECTION PARAMETER (X) | | | | | DEVIATION (Y) |
|---|---|---|---|---|---|
| CHARACTERISTIC a | CHARACTERISTIC b | CHARACTERISTIC c | CHARACTERISTIC d | CHARACTERISTIC e | DEVIATION |
| 37,500 | 190 | 64,500 | 30,000 | 690,000 | 4,200 |
| 47,500 | 790 | 54,000 | 75,000 | 1,066,000 | 5,100 |
| 57,500 | 390 | 60,000 | 40,000 | 1,183,000 | 5,150 |
| 72,500 | 1,590 | 52,500 | 32,500 | 1,235,000 | 5,800 |
| 87,500 | 310 | 57,000 | 52,500 | 1,430,000 | 5,870 |
| 102,500 | 1,330 | 63,000 | 75,000 | 1,781,000 | 6,500 |
| 117,500 | 1,090 | 67,500 | 52,500 | 1,846,000 | 7,100 |
| 132,500 | 630 | 67,500 | 50,000 | 1,890,200 | 7,300 |

FIG. 14

ANALYSIS PATTERN I: MULTIPLE REGRESSION ANALYSIS WHEN a, b, c, d, AND e ARE APPLIED TO MANUFACTURING DIRECTION PARAMETERS

REGRESSION STATISTICS

| NUMBER OBSERVED | 8 |
|---|---|
| Ru | 0.921238 |

| | COEFFICIENT | STANDARD ERROR | VALUE P |
|---|---|---|---|
| INTERCEPT | 3556.043 | 1160.827 | 0.092080128 |
| a | 0.022553 | 0.013942 | 0.247157511 |
| b | 0.20007 | 0.206896 | 0.435560255 |
| c | -0.00976 | 0.019297 | 0.663358237 |
| d | 5.98E-05 | 0.007089 | 0.994031375 |
| e | 0.000652 | 0.001191 | 0.638814504 |

ANALYSIS PATTERN II: MULTIPLE REGRESSION ANALYSIS WHEN a AND b ARE APPLIED TO MANUFACTURING DIRECTION PARAMETERS

REGRESSION STATISTICS

| | | |
|---|---|---|
| NUMBER OBSERVED | 8 | ~700 |
| Ru | 0.962548 | |

FIG. 16A

| | COEFFICIENT | STANDARD ERROR | VALUE P | ~710 |
|---|---|---|---|---|
| INTERCEPT | 3257.466 | 167.1617 | 6.56768E−06 | |
| a | 0.029011 | 0.001923 | 2.31798E−05 | |
| b | 0.309769 | 0.129258 | 0.061887056 | |

FIG. 16B

ANALYSIS PATTERN III: MULTIPLE REGRESSION ANALYSIS WHEN ONLY a IS APPLIED TO MANUFACTURING DIRECTION PARAMETER

REGRESSION STATISTICS

| | | |
|---|---|---|
| NUMBER OBSERVED | 8 | ~800 |
| Ru | 0.939037 | |

FIG. 17A

| | COEFFICIENT | STANDARD ERROR | VALUE P | ~810 |
|---|---|---|---|---|
| INTERCEPT | 3377.588 | 213.3889 | 4.03373E−06 | |
| a | 0.030533 | 0.002429 | 1.55079E−05 | |

FIG. 17B (PROCEDURES 2) SELECTION OF OPTIMUM REGRESSION MODEL FORMULA BASED ON MANUFACTURING DIRECTION PARAMETER SELECTION REFERENCE VALUES Ru   900

| | MANUFACTURING DIRECTION PARAMETERS (x) | | | | | NUMBER OF MANUFACTURING DIRECTION PARAMETERS | NUMBER OF DATA | MULTIPLE CORRELATION COEFFICIENT R |
|---|---|---|---|---|---|---|---|---|
| | a | b | c | d | e | | | |
| ANALYSIS PATTERN 1 | ○ | ○ | ○ | ○ | ○ | 5 | 8 | 0.994358 |
| ANALYSIS PATTERN 2 | ○ | ○ | — | — | — | 2 | 8 | 0.991452 |
| ANALYSIS PATTERN 3 | ○ | — | — | — | — | 1 | 8 | 0.981541 |

| | MANUFACTURING DIRECTION PARAMETERS (x) | | | | | NUMBER OF MANUFACTURING DIRECTION PARAMETERS | Ru | OPTIMUM |
|---|---|---|---|---|---|---|---|---|
| | a | b | c | d | e | | | |
| ANALYSIS PATTERN 1 | ○ | ○ | ○ | ○ | ○ | 5 | 0.92 | |
| ANALYSIS PATTERN 2 | ○ | ○ | — | — | — | 2 | 0.96 | ◎ |
| ANALYSIS PATTERN 3 | ○ | — | — | — | — | 1 | 0.94 | |

| ANALYSIS PATTERN 2 | |
|---|---|
| | COEFFICIENT |
| INTERCEPT | *3,257.466* |
| a | *0.029011* |
| b | *0.309769* |

FIG. 18C (MANUFACTURING DIRECTION SCREEN)
OBJECTIVE: ALARM ITEM REQUIRING
CAUTION BY CHANGING COLOR

| DIRECTION No. | FACTORY | PROCESS | EQUIPMENT |
|---|---|---|---|
| 001 | A01 | JTN | JUICER01 |

| ITEM | QUANTITY |
|---|---|
| XS0310 | 10 |
| XL0320 | 20 |

← 1000

(MANUFACTURING DIRECTION SCREEN)
OBJECTIVE: ALARM ITEM REQUIRING
CAUTION BY BLINKING

| DIRECTION No. | FACTORY | PROCESS | EQUIPMENT |
|---|---|---|---|
| 002 | B01 | ROK | STRAINER |

| ITEM | NUMBER OF TIMES |
|---|---|
| XM0330 | 3 |
| XM0340 | 2 |

← 1010

(MANUFACTURING DIRECTION SCREEN)
OBJECTIVE: ALARM ITEM REQUIRING CAUTION
FROM HELP ASSISTANT

| DIRECTION No. | FACTORY | PROCESS | EQUIPMENT |
|---|---|---|---|
| 003 | C02 | KRY | TANK01 |

| ITEM | QUANTITY |
|---|---|
| YS0350 | 30 |

CONCENTRATE ON
WATCHING SCALES DURING
MEASURING PROCESS!!

WORK SUPPORT SYSTEM, WORK SUPPORT METHOD, AND STORAGE MEDIUM

CROSS-REFERENCE TO RELATED APPLICATIONS

The present application claims the benefit of priority to Japanese Patent Application No. 2009-243643, filed Oct. 22, 2009, of which full contents are incorporated herein by reference.

BACKGROUND OF THE INVENTION

1. Field of the Invention

The present invention relates to a work support system, a work support method, and a work support program. More specifically, the present invention relates to a technique for enabling the content of an operating instruction to each worker in a manufacturing process to be controlled based on a manufacturing direction to the worker and manufacturing achievement, work proficiency, and the like of the worker for the manufacturing direction.

2. Related Art

Techniques for operating interfaces in various manufacturing lines and the like according to proficiency and other factors of workers have been proposed to date. For example, for an objective to provide an adaptive human interface whose behavior is changeable suitably for preference and proficiency of users, there has been proposed an adaptive human interface (see Japanese Patent Application Publication No. Hei 10-20985) including an information collection part to collect user information by issuing one or more questions to a user, an information storage part to store the user information, a characteristic analysis part to analyze a user characteristic based on the user information, a characteristic storage part to store the user characteristic, and a behavior change part to change behavior of the human interface based on the user characteristic.

SUMMARY OF THE INVENTION

Nevertheless, a technique is yet to be proposed for controlling the content of an operating instruction to each worker in a manufacturing process, based on a manufacturing direction to the worker and manufacturing achievement, work proficiency, and the like of the worker for the manufacturing direction.

The present invention has been made in view of the above problem. A main object of the present invention is to provide a technique for enabling an operating instruction to each worker in a manufacturing process to be controlled based on a manufacturing direction to the worker and on manufacturing achievement, work proficiency, and the like of the worker for the manufacturing direction.

A work support system according to the present invention solving the above problem is a computer system including a storage device configured to store a manufacturing direction database storing a manufacturing direction parameter generated in product manufacturing, a direction achievement database storing manufacturing achievement data of a manufacturing process performed in accordance with the manufacturing direction parameter, an alarm level database defining alarm information to be given to a worker on a manufacturing line depending on the size of a deviation between manufacturing direction and the manufacturing achievement, and a multiple regression analysis program to execute a multiple regression analysis. The work support system includes the following parts.

To put it specifically, the work support system includes a data reading part configured to read a group of manufacturing direction parameters and the manufacturing achievement data corresponding to the group of manufacturing direction parameters from the manufacturing direction database and the direction achievement database, to calculate a deviation between a given target value indicated by the group of manufacturing direction parameters and a given achievement value indicated by the manufacturing achievement data, and to store the group of manufacturing direction parameters and the deviation into a deviation factor database in the storage device.

Moreover, the work support system includes a candidate selection part configured to calculate risk rates of all parameters included in the group of manufacturing direction parameters and calculate an average value of the calculated risk rates of the parameters in accordance with the multiple regression analysis program using the group of manufacturing direction parameters in the deviation factor database as explanatory variables and using the deviation as an objective variable, and to specify a manufacturing direction parameter having the risk rate equal to or below the average value as a selection candidate.

In addition, the work support system includes a parameter specification part configured to calculate a multiple correlation coefficient, the number of parameters, and the number of samples for each of the group of manufacturing direction parameters and the manufacturing direction parameter of the selection candidate, to calculate an explanatory variable selection reference value, in accordance with the multiple regression analysis program, based on the multiple correlation coefficient, the number of parameters, and the number of samples thus calculated, to specify, as optimum parameters, one of the group of manufacturing direction parameters and the manufacturing direction parameter of the selection candidate that has the largest explanatory variable selection reference value, and to store information on the optimum parameters in the deviation factor database in association with the specified manufacturing direction parameters.

Furthermore, the work support system includes an alarm specification part configured to check parameters included in a manufacturing direction newly stored in the manufacturing direction database against the deviation factor database, when the parameters of the new manufacturing direction match the manufacturing direction parameters associated with the information on the optimum parameters in the deviation factor database, to extract information on the deviation associated with the group of the matched manufacturing direction parameters in the deviation factor database, to check the information on the deviation against the alarm level database to specify alarm information corresponding to the deviation, and to store the alarm information in the storage device in association with the new manufacturing direction.

Moreover, the work support system includes an operation processing part configured to receive designation information for a manufacturing direction through an input device, to read the manufacturing direction corresponding to the designation information from the manufacturing direction database, to read output data associated with a work procedure indicated by the group of parameters in the manufacturing direction, from the storage device based on information on the work procedure, to read the alarm information stored for the manufacturing direction from the storage device, and to perform any of an operation of replacing all or part of the output data with the alarm information and outputting the resultant data to the output device and an operation of outputting the alarm information to the output device together with the output data.

Note that, in the work support system, the storage device may store a proficiency database storing proficiency information on each work procedure for each worker engaged in product manufacturing, and an education database storing information on an educational program to be taken by a worker according to a change in proficiency in a work procedure.

In this case, the work support system preferably includes: a proficiency change part configured to specify the groups of manufacturing direction parameters in the deviation factor database having same manufacturing direction parameters indicating identification information on a worker engaged in product manufacturing and a work procedure, and to update proficiency information of the worker for the work procedure with information indicating proficiency reduced just by a predetermined level in the proficiency database when the number of deviations associated with the specified groups of manufacturing direction parameters and having values equal to or above a prescribed value exceeds a prescribed value; and an educational content specification part configured to specify, for the work procedure for which the proficiency is reduced by the predetermined level, the educational program corresponding to the reduction in the proficiency level in the education database, and to output information on the educational program to the output device.

In addition, a work support method according to the present invention is to be executed by a computer system including a storage device configured to store a manufacturing direction database storing a manufacturing direction parameter generated in product manufacturing, a direction achievement database storing manufacturing achievement data of a manufacturing process performed in accordance with the manufacturing direction parameter, an alarm level database defining alarm information to be given to a worker on a manufacturing line depending on the size of a deviation between manufacturing direction and the manufacturing achievement, and a multiple regression analysis program to execute a multiple regression analysis.

To put it specifically, the work support method comprises: processing to read a group of manufacturing direction parameters and the manufacturing achievement data corresponding to the group of manufacturing direction parameters from the manufacturing direction database and the direction achievement database, to calculate a deviation between a given target value indicated by the group of manufacturing direction parameters and a given achievement value indicated by the manufacturing achievement data, and to store the group of manufacturing direction parameters and the deviation into a deviation factor database in the storage device; processing to calculate risk rates of all parameters included in the group of manufacturing direction parameters and calculate an average value of the calculated risk rates of the parameters in accordance with the multiple regression analysis program using the group of manufacturing direction parameters in the deviation factor database as explanatory variables and using the deviation as an objective variable, and to specify a manufacturing direction parameter having the risk rate equal to or below the average value as a selection candidate; processing to calculate a multiple correlation coefficient, the number of parameters, and the number of samples for each of the group of manufacturing direction parameters and the manufacturing direction parameter of the selection candidate, to calculate an explanatory variable selection reference value, in accordance with the multiple regression analysis program, based on the multiple correlation coefficient, the number of parameters, and the number of samples thus calculated, to specify, as optimum parameters, one of the group of manufacturing direction parameters and the manufacturing direction parameter of the selection candidate that has the largest explanatory variable selection reference value, and to store information on the optimum parameters in the deviation factor database in association with the specified manufacturing direction parameters; processing to check parameters included in a manufacturing direction newly stored in the manufacturing direction database against the deviation factor database, when the parameters of the new manufacturing direction match the manufacturing direction parameters associated with the information on the optimum parameters in the deviation factor database, to extract information on the deviation associated with the group of the matched manufacturing direction parameters in the deviation factor database, to check the information on the deviation against the alarm level database to specify alarm information corresponding to the deviation, and to store the alarm information in the storage device in association with the new manufacturing direction; and processing to receive designation information for a manufacturing direction through an input device, to read the manufacturing direction corresponding to the designation information from the manufacturing direction database, to read output data associated with a work procedure indicated by the group of parameters in the manufacturing direction, from the storage device based on information on the work procedure, to read the alarm information stored for the manufacturing direction from the storage device, and to perform any of an operation of replacing all or part of the output data with the alarm information and outputting the resultant data to the output device and an operation of outputting the alarm information to the output device together with the output data.

A work support program according to the present invention causes a computer system to execute the following processing. The computer system includes a storage device configured to store a manufacturing direction database storing a manufacturing direction parameter generated in product manufacturing, a direction achievement database storing manufacturing achievement data of a manufacturing process performed in accordance with the manufacturing direction parameter, an alarm level database defining alarm information to be given to a worker on a manufacturing line depending on the size of a deviation between manufacturing direction and the manufacturing achievement, and a multiple regression analysis program to execute a multiple regression analysis.

To put it specifically, the work support program causes the computer to execute: processing to read a group of manufacturing direction parameters and the manufacturing achievement data corresponding to the group of manufacturing direction parameters from the manufacturing direction database and the direction achievement database, to calculate a deviation between a given target value indicated by the group of manufacturing direction parameters and a given achievement value indicated by the manufacturing achievement data, and to store the group of manufacturing direction parameters and the deviation into a deviation factor database in the storage device; processing to calculate risk rates of all parameters included in the group of manufacturing direction parameters and calculate an average value of the calculated risk rates of the parameters in accordance with the multiple regression analysis program using the group of manufacturing direction parameters in the deviation factor database as explanatory variables and using the deviation as an objective variable, and to specify a manufacturing direction parameter having the risk rate equal to or below the average value as a selection candidate; processing to calculate a multiple correlation coefficient, the number of parameters, and the number of samples for each of the group of manufacturing direction parameters and the manufacturing direction parameter of the selection candidate, to calculate an explanatory variable selection reference value, in accordance with the multiple regression analysis program, based on the multiple correlation coefficient, the number of parameters, and the number of samples thus calculated, to specify, as optimum parameters, one of the group of manufacturing direction parameters and the manufacturing direction parameter of the selection candidate that has the largest explanatory variable selection reference value, and to store information on the optimum parameters in the deviation factor database in association with the specified manufacturing direction parameters; processing to check parameters included in a manufacturing direction newly stored in the manufacturing direction database against the deviation factor database, when the parameters of the new manufacturing direction match the manufacturing direction parameters associated with the information on the optimum parameters in the deviation factor database, to extract information on the deviation associated with the group of the matched manufacturing direction parameters in the deviation factor database, to check the information on the deviation against the alarm level database to specify alarm information corresponding to the deviation, and to store the alarm information in the storage device in association with the new manufacturing direction; and processing to receive designation information for a manufacturing direction through an input device, to read the manufacturing direction corresponding to the designation information from the manufacturing direction database, to read output data associated with a work procedure indicated by the group of parameters in the manufacturing direction, from the storage device based on information on the work procedure, to read the alarm information stored for the manufacturing direction from the storage device, and to perform any of an operation of replacing all or part of the output data with the alarm information and outputting the resultant data to the output device and an operation of outputting the alarm information to the output device together with the output data.

According to the present invention, the content of an operating instruction to each worker in a manufacturing process can be controlled based on a manufacturing direction to the worker and on manufacturing achievement, work proficiency, and the like of the worker for the manufacturing direction.

BRIEF DESCRIPTION OF THE DRAWINGS

FIG. 5 is a diagram showing an example of a data structure of a deviation factor database according to the present embodiment;

FIG. 6 is a diagram showing an example of a data structure of an alarm level database according to the present embodiment;

FIG. 7 is a diagram showing an example of a data structure of a proficiency database according to the present embodiment;

FIG. 8 is a diagram showing an example of a data structure of an education database according to the present embodiment;

FIG. 9 is a diagram showing an example of a data structure of a navigation version database according to the present embodiment;

FIG. 10 is a diagram showing an example of a data structure of an operating precaution database according to the present embodiment;

FIG. 14 is a diagram showing an example of information on a group of manufacturing direction parameters and corresponding deviations according to the present embodiment;

FIGS. 15A and 15B are diagrams showing a risk rate calculation result of each of manufacturing direction parameters according to the present embodiment;

FIGS. 16A and 16B are diagrams showing an example of a risk rate calculation result according to the present embodiment;

FIGS. 17A and 17B are diagrams showing a risk rate calculation result of each of manufacturing direction parameters according to the present embodiment;

FIG. 18A is a diagram showing an example of a calculation result of a multiple correlation coefficient R, the number of parameters, and the number of samples, FIG. 18B is a diagram showing an example of a calculation result of explanatory variable selection reference values Ru, and FIG. 18C is a diagram showing an example of optimum parameters according to the present embodiment;

FIG. 22 is a diagram showing screen examples according to the present embodiment.

DESCRIPTION OF THE PREFERRED EMBODIMENTS

System Configuration

Figure 1:
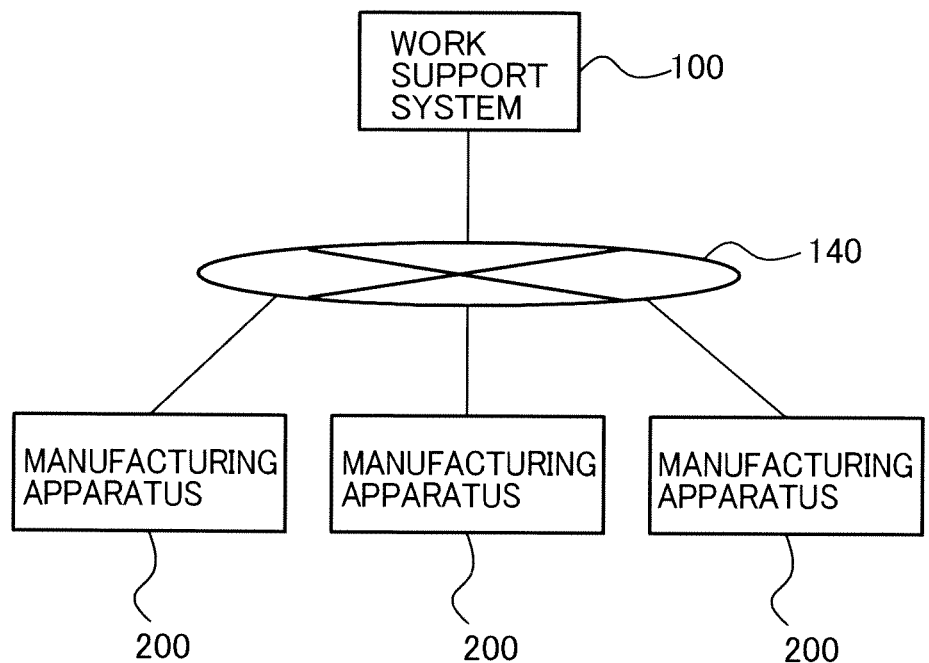
FIG. 1 is a network configuration diagram including a work support system according to the present embodiment.
Figure 2:
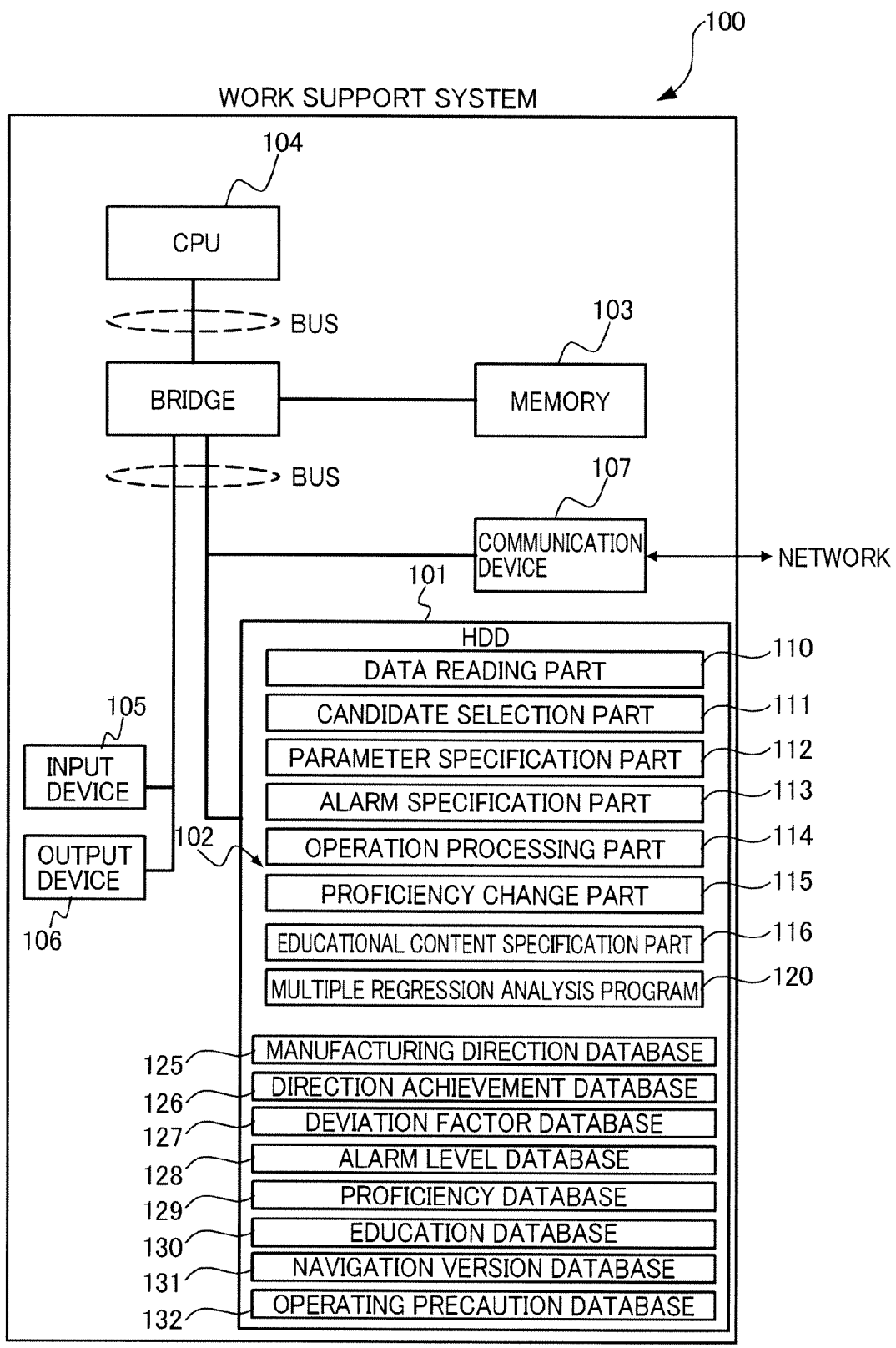
FIG. 2 is a diagram showing an example of a hardware configuration of the work support system according to the present embodiment.

An embodiment of the present invention will be described below in detail with reference to the accompanying drawings. FIG. 1 is a network configuration diagram including a work support system 100 according to the present embodiment; and FIG. 2 is a diagram showing an example of a hardware configuration of the work support system 100 according to the present embodiment. The work support system 100 (hereinafter the system 100) shown in FIG. 1 is a computer system configured to enable the content of an operating instruction to each worker in a manufacturing process to be controlled based on a manufacturing direction to the worker and on manufacturing achievement, work proficiency, and the like of the worker for the manufacturing direction.

In order to implement functions to execute a work support method, the system 100 loads a program 102 stored in a storage device 101 such as a non-volatile memory to a memory 103, and then executes the program 102 by using a CPU 104 serving as a processing unit. Meanwhile, the system 100 may include an input device 105 including various buttons, a keyboard, and the like, and an output device 106 such as a LED or a display device as usually provided in a computer apparatus. The system may also include a communication device 107 configured to perform communications with other apparatuses such as a manufacturing apparatus 200 through a network 140.

Here, the manufacturing apparatus 200 is an apparatus configured to receive manufacturing directions from the system 100 and to transmit manufacturing achievement (e.g., quantity manufactured, the number of defects, and the like) corresponding to the manufacturing direction to the system 100. Therefore, the manufacturing apparatus 200 naturally includes a processing unit, a storage device, and a communication device which are supposed to be provided in a computer apparatus.

Next, functional parts configured and retained by the system 100 based on the program 102, for example, will be described. While these parts may be integrally provided in a single server apparatus or the like, the parts may be distributed into a group of computers located on the network 140 (including a server apparatus serving as the system 100) and may operate in cooperation with each other under the control of the particular server apparatus (the system 100) in the group. Here, the storage device 101 of the system 100 includes a manufacturing direction database 125, a direction achievement database 126, a deviation factor database 127, an alarm level database 128, a proficiency database 129, an education database 130, a navigation version database 131, an operating precaution database 132, and a multiple regression analysis program 120 for executing a multiple regression analysis, all of which will be described later.

The system 100 includes a data reading part 110 configured to read a group of manufacturing direction parameters and corresponding manufacturing achievement data from the manufacturing direction database 125 and the direction achievement database 126, to calculate a deviation between a given target value indicated by the group of manufacturing direction parameters and a given achievement value indicated by the manufacturing achievement data, and to store the group of manufacturing direction parameters and the deviation into the deviation factor database 127 in the storage device.

The system 100 further includes a candidate selection part 111 configured to calculate risk rates of respective parameters included in the group of manufacturing direction parameters and to calculate an average value of all the calculated risk rates of the parameters in accordance with the multiple regression analysis program 120 using the group of manufacturing direction parameters in the deviation factor database 127 as explanatory variables and using the deviation thereof as an objective variable, and to specify selection candidates each including one or more manufacturing direction parameters each having the risk rate equal to or below the average value.

The system 100 further includes a parameter specification part 112. For each of the group of manufacturing direction parameters and the selection candidates of the manufacturing direction parameters, the parameter specification part 112 calculates a multiple correlation coefficient, the number of parameters, and the number of samples, and calculates an explanatory variable selection reference value based on the multiple correlation coefficient, the number of parameters, and the number of samples thus calculated in accordance with the multiple regression analysis program 120. Then, the parameter specification part 112 specifies, as optimum parameters, any of the group of manufacturing direction parameters and the selection candidates of the manufacturing direction parameters that has the largest explanatory variable selection reference value, and stores information on the optimum parameters in the deviation factor database 127 in association with the specified manufacturing direction parameters.

The system 100 further includes an alarm specification part 113. The alarm specification part 113 checks parameters included in a manufacturing direction newly stored in the manufacturing direction database 125, against the deviation factor database 127. When the parameters of the new manufacturing direction match the manufacturing direction parameters associated with the information on the optimum parameters in the deviation factor database 127, the alarm specification part 113 extracts information on the deviation associated with the group of the matched manufacturing direction parameters in the deviation factor database 127, checks the information on the deviation against the alarm level database 128 to specify alarm information corresponding to the deviation, and stores the alarm information in the operating precaution database 132 in the storage device 101 in association with the new manufacturing direction.

The system 100 further includes an operation processing part 114 configured to receive designation information for a manufacturing direction through the input device 105, to read the manufacturing direction corresponding to the designation information from the manufacturing direction database 125, to read output data associated with a work procedure indicated by the group of manufacturing direction parameters from the storage device based on information on the work procedure, to read the alarm information stored for the manufacturing direction from the operating precaution database 132 in the storage device 101, and to perform either an operation of replacing all or part of the output data with the alarm information and outputting the resultant data to the output device 106 or an operation of outputting the alarm information together with the output data to the output device 106.

The system 100 further includes a proficiency change part 115 configured to specify the groups of manufacturing direction parameters in the deviation factor database 127 having same manufacturing direction parameters indicating identification information on a worker engaged in product manufacturing and a work procedure, and to update proficiency information of the worker for the work procedure with information indicating proficiency reduced just by a predetermined level in the proficiency database 129 when the number of deviations associated with the specified group of manufacturing direction parameters and having values equal to or above a prescribed value exceed a prescribed value.

The system 100 further includes an educational content specification part 116 configured to specify, for the work procedure for which the proficiency is reduced by the predetermined level, an educational program corresponding to reduction in the proficiency level in the education database 130, and to output information on the educational program to the output device 106.

The parts 110 to 116 in the system 100 described above may be implemented either as hardware or as programs stored in an appropriate storage device such as a memory or an HDD (hard disk drive). In the latter case, a controller such as the CPU is supposed to read the programs from the storage device along with execution of the programs and then to execute the programs.

Examples of Data Structures

Figure 3:
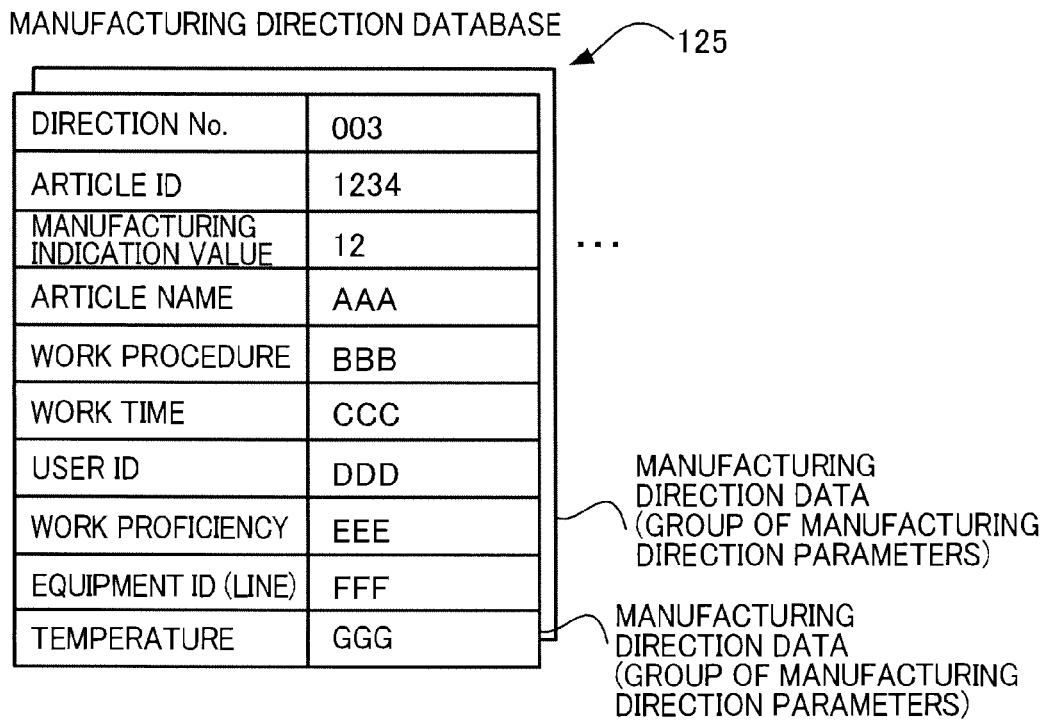
FIG. 3 is a diagram showing an example of a data structure of a manufacturing direction database according to the present embodiment.

Next, examples of data structures of the databases and the like used by the system 100 according to the present embodiment will be described. FIG. 3 is a diagram showing an example of a data structure of the manufacturing direction database 125 according to the present embodiment. The manufacturing direction database 125 is the database for storing the manufacturing directions generated in connection with product manufacturing. For example, the manufacturing direction database 125 includes a set of records each formed by using a direction number (No.) as a key and associating various data of the group of manufacturing direction parameters with one another. Here, the data include an article identification data (ID) of a product to be manufactured in accordance with the direction, a manufacturing indication value indicating a given target value such as the number of products to be manufactured, an article name, identification information on a work procedure to be performed at the time of manufacture, work time, a user ID for identifying a worker engaged in a manufacturing work, proficiency of the worker, an equipment ID indicating a manufacturing apparatus performing the work, a manufacturing temperature, and the like.

Figure 4:
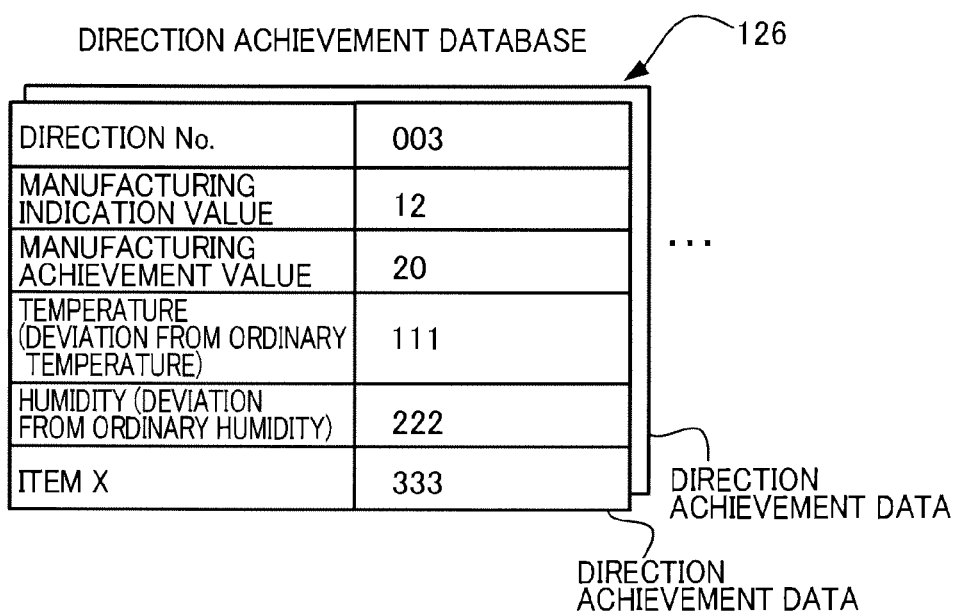
FIG. 4 is a diagram showing an example of a data structure of a direction achievement database according to the present embodiment.

FIG. 4 is a diagram showing an example of a data structure of the direction achievement database 126. The direction achievement database 126 is the database for storing manufacturing achievement data in a manufacturing process carried out in response to the manufacturing direction parameters. For example, the direction achievement database 126 includes a set of records each formed by using the direction No. as the key and associating various data with one another. Here, the data include the manufacturing indication value, a manufacturing achievement value indicating a given achievement value such as the number of actually manufactured products representing the manufacturing achievement, a temperature at the time of manufacture, and the like.

Here, in order to generate the records for the databases, the communication device 107 of the system 100 communicates with a manufacturing achievement collection apparatus (such as a controller for line control installed on a manufacturing line, a wireless handheld terminal to be carried by a manufacturing line manager or others for inputting various information at the time of manufacture, or a bar code reader for counting the number of manufactured products and so forth) through the network 140 and thereby collects the manufacturing achievement data. The information to be thus collected includes the direction No., the article ID, the manufacturing achievement, and the like.

FIG. 5 is a diagram showing an example of a data structure of the deviation factor database 127. The deviation factor database 127 is the database in which the deviation between the given target value indicated by the group of manufacturing direction parameters in the manufacturing direction database 125 and the given achievement value indicated by the manufacturing achievement data in the direction achievement database 126 is stored in association with the group of manufacturing direction parameters. For example, the deviation factor database 127 includes a set of records each formed by using the article ID (one of the group of manufacturing direction parameters) as the key and associating the group of manufacturing direction parameters with the deviation as well as a deviation level. Here, the group of manufacturing direction parameters includes an article group, the work procedure, the work time, the user ID, the work proficiency, the equipment ID, the temperature, and the like. In the example shown here, the deviation factor database 127 includes the deviation level in addition to the deviation. The deviation level is a numerical value of a level into which the deviation is classified by size (for instance, the deviation levels are set to "10" to "1" for the deviations "1" to "10," respectively). For the manufacturing direction parameters specified as the optimum parameters, the information on the optimum parameter is added by using a flag such as a value "1" or alternatively by storing the parameter values in an underlined and bold manner, for example.

FIG. 6 is a diagram showing an example of a data structure of the alarm level database 128. The alarm level database 128 is the database for defining the alarm information to be given to the worker on the manufacturing line depending on the size of the deviation between the manufacturing direction and the manufacturing achievement. For example, the alarm level database 128 includes a set of records each formed by using the deviation level (and/or the deviation) as the key and associating the alarm information defined based on the deviation level with one another. Here, the alarm information includes a change of a predetermined region on an output screen into a predetermined color, blink, help information, alarm sound, alarm vibration, and the like. In the example of the alarm level database 128 shown in FIG. 6, a value "1" is set for the required alarm information (e.g., "screen color change" and "sound"), for example.

FIG. 7 is a diagram showing an example of a data structure of the proficiency database 129. The proficiency database 129 is the database for storing proficiency information on the work procedures for each worker engaged in product manufacturing. For example, the proficiency database 129 includes a set of records each formed by using the user ID as the key and associating the identification information on the work procedure and the proficiency level with one another.

FIG. 8 is a diagram showing an example of a data structure of the education database 130. The education database 130 is the database for storing information on educational programs to be taken by each worker depending on a change in proficiency in the work procedure. For example, the education database 130 includes a set of records each formed by using the identification information on the work procedure as the key and associating information on the educational programs depending on the proficiency levels with one another.

FIG. 9 is a diagram showing an example of a data structure of the navigation version database 131. The navigation version database 131 is the database for storing output data to be outputted on a manufacturing site and the like in accordance with the work procedures. For example, the navigation version database 131 includes a set of records each formed by using the identification information on the work procedure as the key and associating the output data (e.g., screen transition versions, screen data, sound data, vibration data, and the like) with one another.

FIG. 10 is a diagram showing an example of a data structure of the operating precaution database 132. The operating precaution database 132 is the database in which the alarm information to be outputted at the time of execution of the manufacturing direction (the information to be given to the worker on the manufacturing line depending on the size of the deviation) is stored in association with the manufacturing direction. For example, the operating precaution database 132 includes a set of records each formed by using a manufacturing direction No. as the key and associating the data including the article ID, the work time, the user ID, the article group, the alarm information (screen color, blink, help, sound, vibration, etc.), and the like with one another.

Example 1 of Procedures

Actual procedures of a work support method according to the present embodiment will be described below with reference to the accompanying drawings. Various actions corresponding to the work support method to be described below are taken by executing the programs which are loaded to the memory of the system 100. Moreover, the programs include codes for executing the various actions to be described below.

Figure 11:
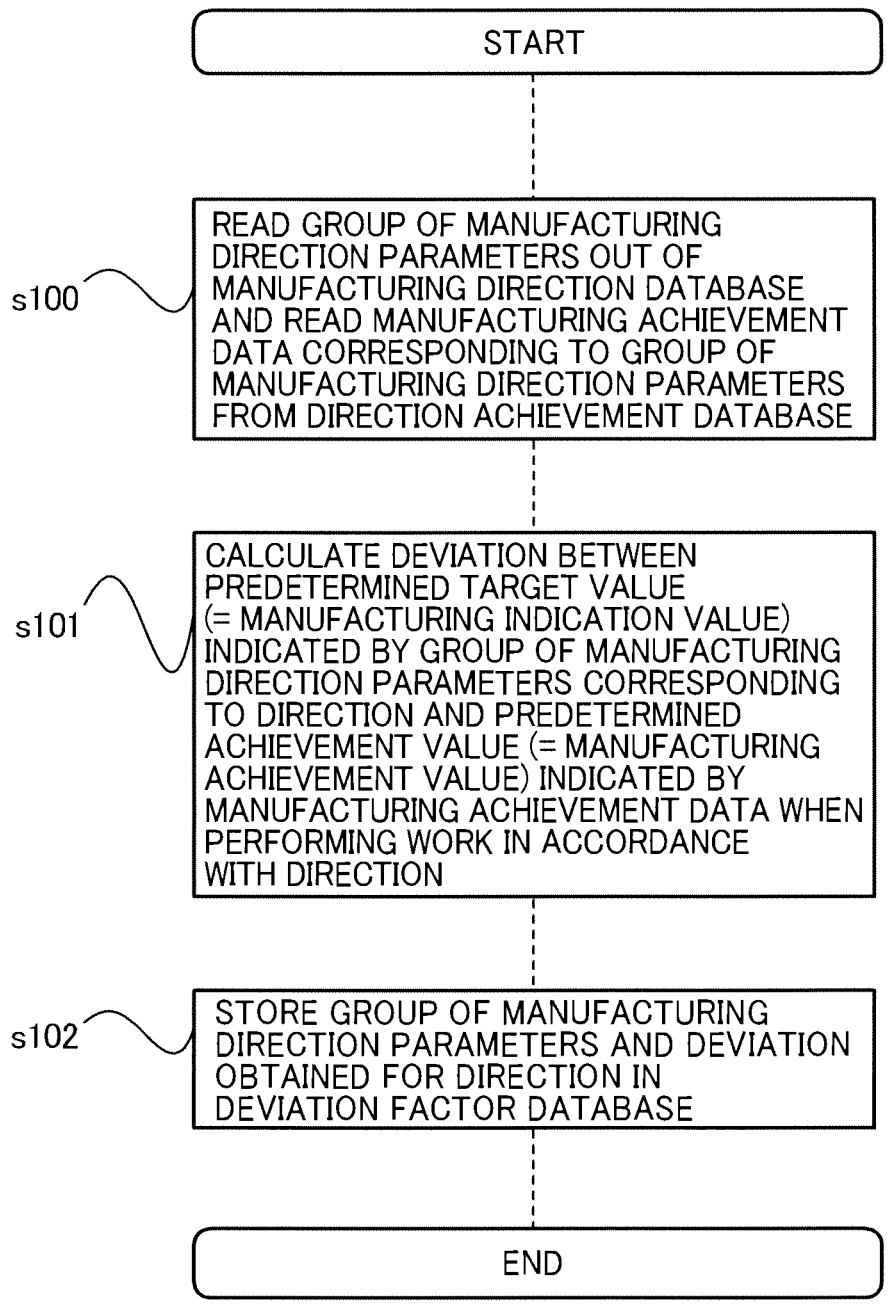
FIG. 11 is a diagram showing a process flow example 1 of a work support method according to the present embodiment.
Figure 12:
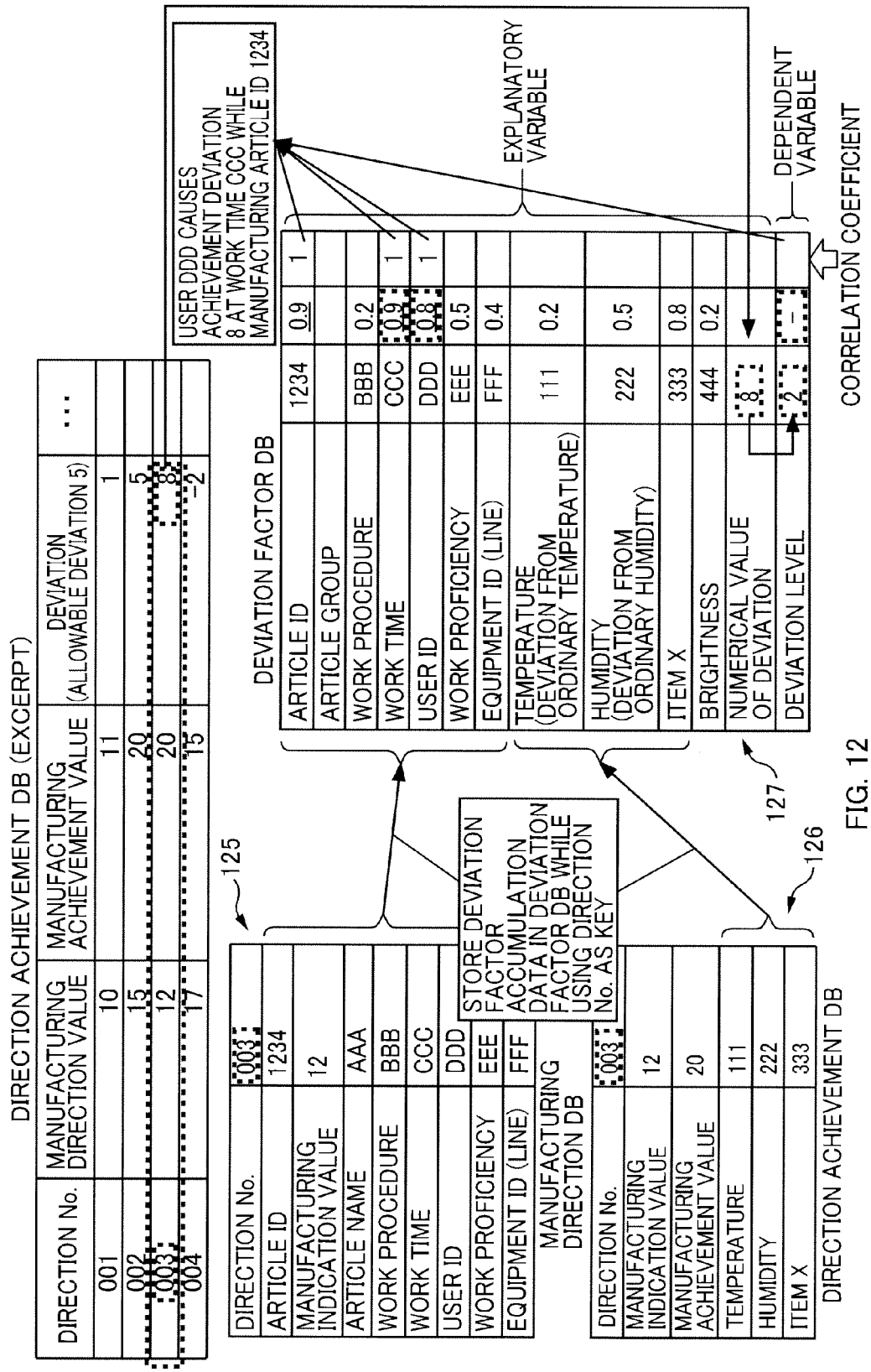
FIG. 12 is an explanatory diagram associated with the process flow example 1 according to the present embodiment.

FIG. 11 is a diagram showing a process flow example 1 of the work support method according to the present embodiment and FIG. 12 is an explanatory diagram associated with the process flow example 1. Here, processing for calculating the deviation occurring between the manufacturing direction and the manufacturing achievement will be described first. In this case, the data reading part 110 of the system 100 reads the group of manufacturing direction parameters from the manufacturing direction database 125 and reads the manufacturing achievement data corresponding to the group of manufacturing direction parameters from the direction achievement database 126, respectively (s100). In the example shown in FIG. 12, the data reading part 110 reads the group of manufacturing direction parameters (the group of parameters including the article ID "1234," the manufacturing indication value "12," the article name "AAA," the work procedure "BBB," the work time "CCC," the user ID "DDD," the work proficiency "EEE," and the equipment ID "FFF") corresponding to the direction No. "003" from the manufacturing direction database 125, and also reads the corresponding manufacturing achievement data (a group of data including the manufacturing indication value "12," the manufacturing achievement value "20," a temperature "111," a humidity "222," and an item X "333") from the direction achievement database 126 while using the direction No. "003" as the key.

Subsequently, the data reading part 110 calculates the deviation between the given target value indicated by the group of manufacturing direction parameters corresponding to the direction No. "003," or namely the manufacturing indication value "12," and the given achievement value indicated by the manufacturing achievement data in the course of execution of the work in accordance with the direction No. "003," or namely the manufacturing achievement value "20," as "20−12=8" (s101). Meanwhile, the data reading part 110 stores the group of manufacturing direction parameters as well as the deviation "8" obtained for the direction No. "003" into the deviation factor database 127 in the storage device 101 (s102). In the example shown in FIG. 12, the data reading part 110 registers the group of manufacturing direction parameters and the deviation data with the deviation factor database 127 while using the article ID "1234" included in the group of manufacturing direction parameters as the key instead of using the direction No. Moreover, in the illustrated example, the data reading part 110 also stores the numerical value determined by classifying the deviation "8" into the level depending on the size thereof, or namely the deviation level "2," in the deviation factor database 127. As for an example of classification of the deviation level, the deviation levels are set to "10" to "1" for the deviations of "1" to "10."

The data reading part 110 of the system 100 repeats execution of the above-described operating steps s100 and s102 for the group of manufacturing direction parameters for every direction No. stored in the manufacturing direction database 125, and thereby builds the records in the deviation factor database 127.

Example 2 of Procedures

Figure 13:
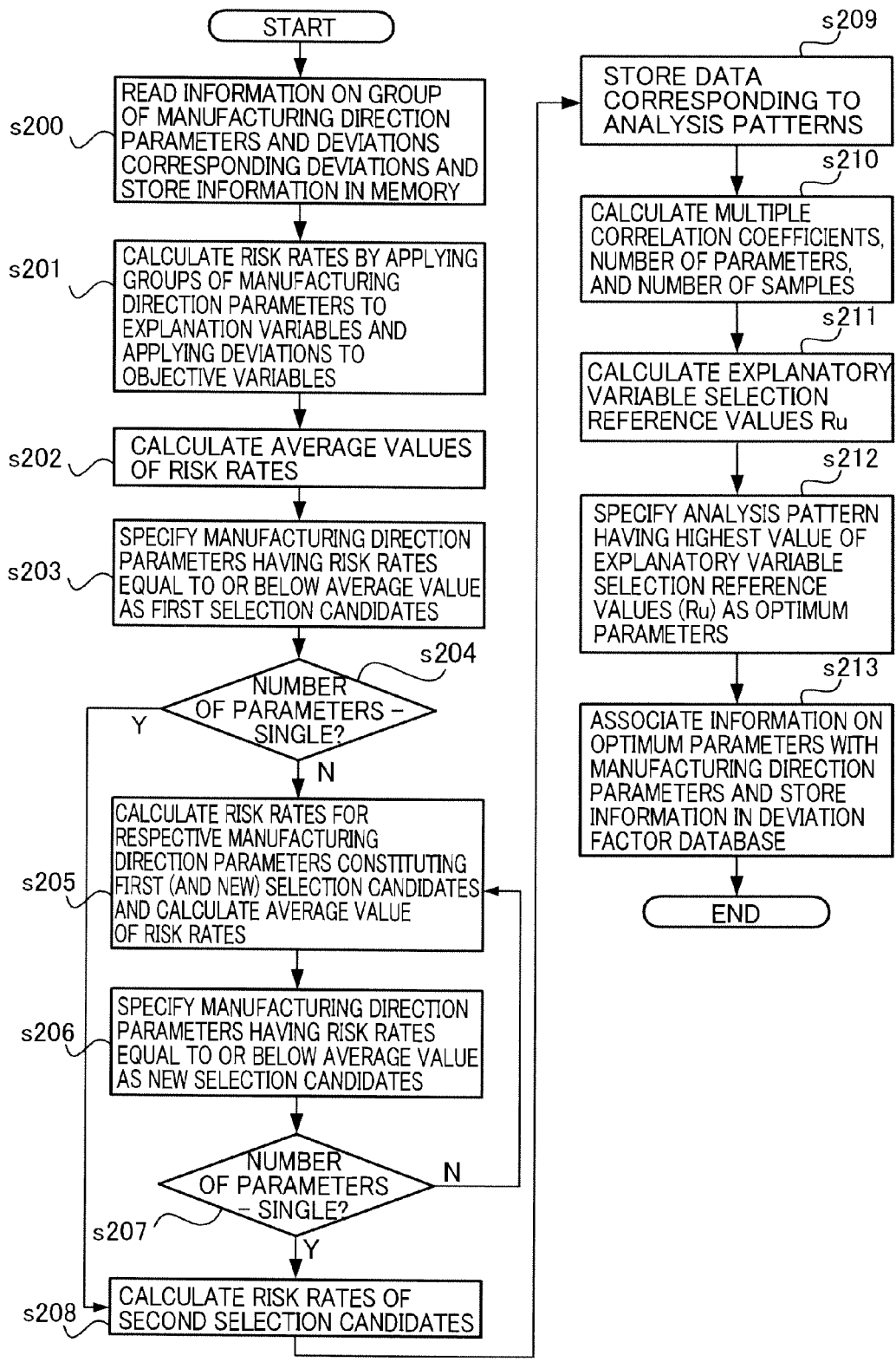
FIG. 13 is a diagram showing a process flow example 2 of the work support method according to the present embodiment.

FIG. 13 is a diagram showing a process flow example 2 of the work support method according to the present embodiment. Processing for specifying the optimum parameter will be described in this section. Here, the system 100 assumes that there are two or more manufacturing direction parameters (Xn) representing explanatory variables (X) which contribute to the deviation representing an objective variable (Y), for example. Then, the system 100 executes a multiple regression analysis as a regression analysis applicable to a case in which there are plural manufacturing direction parameters (X) contributing to the single deviation (Y).

When the plural manufacturing direction parameters are respectively x1, x2, x3, and so on, a multiple regression formula can be expressed as Y=ax1+bx2+cx3+ and so on. Accordingly, the system 100 verifies which element actually affects the deviation. Moreover, the system 100 executes a factor analysis of a degree to which each of the manufacturing direction parameters (X) narrowed down by the verification influences the deviation (Y). It is possible to improve prediction accuracy when the multiple regression formula is formed by using only the necessary factors (the manufacturing direction parameters) resulting from the analysis. Specifically, the system 100 executes the following processing.

First, the candidate selection part 111 of the system 100 reads information on the group of manufacturing direction parameters and on the corresponding deviations from the deviation factor database 127 and stores the information in the memory 103 (s200). FIG. 14 shows an example of the information on the group of manufacturing direction parameters and the corresponding deviations stored in the memory 103 in the step s200. In the example shown in FIG. 14, data sets (parameter values) of eight batches of the five manufacturing direction parameters "a" to "e" and eight corresponding deviations (or the deviation levels) is stored in the memory 103 by way of the system 100.

Subsequently, the candidate selection part 111 of the system 100 reads the multiple regression analysis program 120 from the storage device 101 and calculates a risk rate for each of the manufacturing direction parameters "a" to "e" constituting the group of manufacturing direction parameters with the group of manufacturing direction parameters in the memory 103 used as the explanatory variables and the deviation (or the deviation level) used as an objective variable (s201). FIG. 15B shows a risk rate calculation result 610 for each of the manufacturing direction parameters calculated in the step s201.

Here, a risk rate (value P) means a probability of growth of an error provided that a certain parameter is adopted as the manufacturing direction parameter. When the regression analysis takes place by simply using all of the manufacturing direction parameters, analytical precision may be deteriorated. Therefore, in the case of the above-mentioned example, it is necessary to select a more accurate regression model by narrowing the number of the manufacturing direction parameters "a" to "e" down to a more appropriate number.

Hence the candidate selection part 111 calculates average values of the risk rates calculated in the step s201 among the manufacturing direction parameters "a" to "e" (s202). In the case of the example of the risk rate calculation result 610 shown in FIG. 15B, the average value of the risk rates among the manufacturing direction parameters "a" to "e" is equal to "0.51." Therefore, the candidate selection part 111 specifies the manufacturing direction parameters "a" and "b" having the risk rates below the average value "0.51" in the group of manufacturing direction parameters ("a" to "e") as first selection candidates (s203).

Moreover, the candidate selection part 111 counts the number of the manufacturing direction parameters specified as the first selection candidates (s204), and detects that plural manufacturing direction parameters are included in the first selection candidates (s204; N). Since the two manufacturing direction parameters "a" and "b" are included in the first selection candidates in the above-described example, the candidate selection part 111 counts the number of the manufacturing direction parameters included in the first selection candidates as "2" and thereby detects inclusion of the plural manufacturing direction parameters. On the other hand, the processing goes to step s208 when the number of the manufacturing direction parameters turns out to be single in the step s204 (s204: Y).

In the meantime, upon detection of inclusion of the plural manufacturing direction parameters in the first selection candidates in the step s204, the candidate selection part 111 executes calculation of risk rates of the respective manufacturing direction parameters "a" and "b" constituting the first selection candidates, and calculation of an average value of the risk rates (s205). FIG. 16B shows a risk rate calculation result 710 executed in the step s205. Further, the candidate selection part 111 specifies manufacturing direction parameters having the risk rates equal to or below the average value from the first selection candidates "a" and "b" as new selection candidates (s206). Since the first selection candidates include only the two manufacturing direction parameters "a" and "b" in the example of FIG. 16B, the candidate selection part 111 compares the risk rates between the two manufacturing direction parameters "a" and "b" and specifies the manufacturing direction parameter having the lower risk rate as the new selection candidate (as a second selection candidate in this case) instead of specifying the new selection candidates based on the average value of the risk rates.

Note that the candidate selection part 111 is supposed to repeat execution of the processing of the steps s205 and s206 until the newest selection candidate consists of one manufacturing direction parameter, and thereby to specify plural tiers (the first to n-th) of selection candidates.

Next, the candidate selection part 111 also executes risk rate calculation in the case of applying the second selection candidate "a," which is specified in the step s206, to the manufacturing direction parameter (s208). FIG. 17B is a diagram showing a risk rate calculation result 810 of the manufacturing direction parameter according to the present embodiment.

Based on the results mentioned above, the system 100 specifies the original group of manufacturing direction parameters "a" to "e" and the first and second selection candidates respectively as analysis patterns 1 to 3, and stores data on the group of manufacturing direction parameters "a" to "e" and the first and second selection candidates in the storage device 101 (s209).

Subsequently, the parameter specification part 112 calculates a multiple correlation coefficient, the number of parameters, and the number of samples for each of the group of manufacturing direction parameters "a" to "e," and the plural (the first and second) selection candidates of the manufacturing direction parameters (s210). FIG. 18A shows a calculation result of the multiple correlation coefficient R, the number of parameters, and the number of samples. Here, the multiple correlation coefficient R is calculated by the multiple regression analysis program 120 using an existing method. Meanwhile, the number of parameters and the number of samples are calculated by the parameter specification part 112 counting the number of the manufacturing direction parameters and the number of data sets included in the data of each of the analysis patterns 1 to 3 stored in the storage device.

Next, the parameter specification part 112 of the system 100 calculates an explanatory variable selection reference value Ru in accordance with the multiple regression analysis program 120 based on the multiple correlation coefficient, the number of parameters, and the number of samples calculated in the step s210 (s211). FIG. 18B shows an example of a calculation result of the explanatory variable selection reference values Ru. Here, the explanatory variable selection reference value (Ru) constitutes the basis for judging how many manufacturing direction parameters the regression formula should adopt to be optimum. The pattern having the largest value Ru indicates the optimum number of the manufacturing direction parameters and thereby leads to an optimum model formula. Here, a calculation formula of the explanatory variable selection reference value (Ru) is as follows.

Explanatory Variable Selection Reference Value($Ru$)=
    $1-(1-R^2)(n+k+1)/(n-k-1)$, in which R=multiple correlation coefficient, n=the number of data sets, and k=the number of manufacturing direction parameters.

The parameter specification part 112 specifies the analysis pattern 2 having the largest value "0.96" among the explanatory variable selection reference values (Ru) shown in FIG. 18B as the optimum parameters (s212). Moreover, the parameter specification part 112 stores information on the optimum parameters in the deviation factor database 127 in association with the specified manufacturing direction parameters (s213). As shown in FIG. 5, in the processing for storing the information on the optimum parameters, a flag such as a value "1" representing the information of the optimum parameter is on in each of the records of the manufacturing direction parameters specified as the optimum parameters in the deviation factor database 127, or the values of the specified manufacturing direction parameters are stored in a bold and underlined manner in the deviation factor database 127, for example.

Example 3 of Procedures

Figure 19:
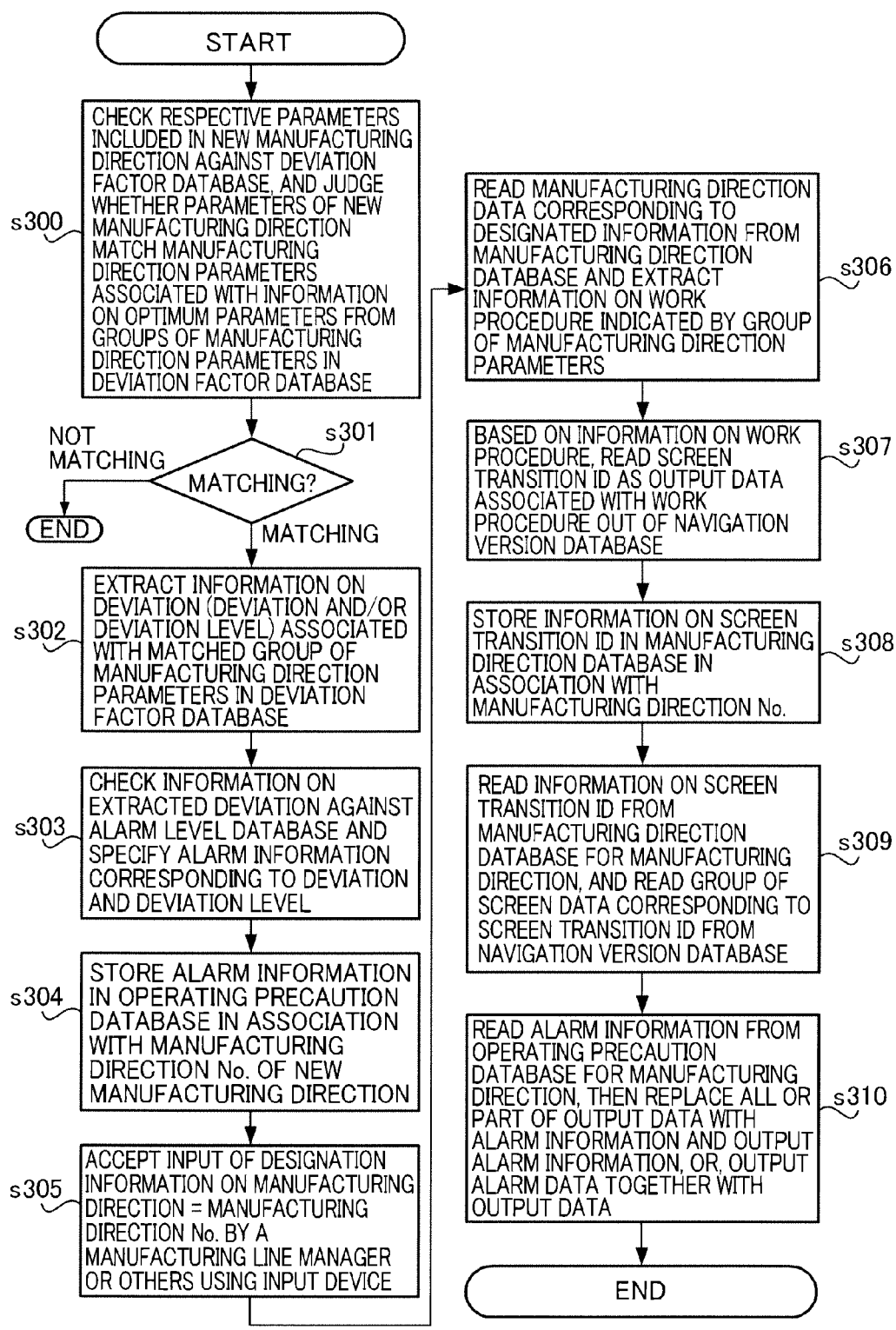
FIG. 19 is a diagram showing a process flow example 3 of the work support method according to the present embodiment.

FIG. 19 is a diagram showing a process flow example 3 of the work support method according to the present embodiment. After execution of the processing described above, the manufacturing direction parameters constituting the factors to significantly affect the deviations are specified for each of products (the article IDs thereof) to be manufactured, and information on the parameters is stored in the deviation factor database 127. Now, processing for checking manufacturing direction parameters concerning a new manufacturing direction against the deviation factor database 127 and for determining the alarm information to be given to the worker on the manufacturing line will be described in this section.

In this case, the alarm specification part 113 of the system 100 is assumed to monitor events to store the manufacturing directions in the manufacturing direction database 125 and to detect storing of a new manufacturing direction by means of addition of a new direction No. record. At this time, for the manufacturing direction (such as a manufacturing direction having a manufacturing direction No. "010") newly stored in the manufacturing direction database 125, the alarm specification part 113 checks the parameters included in the new manufacturing direction No. "010" against the deviation factor database 127 and judges whether or not the parameters of the new manufacturing direction No. "010" match the manufacturing direction parameters associated with the information on the optimum parameters among the groups of manufacturing direction parameters (each of which is a group of parameters for one article ID as illustrated in FIG. 5 and the like) in the deviation factor database 127 (s300).

Figure 20:
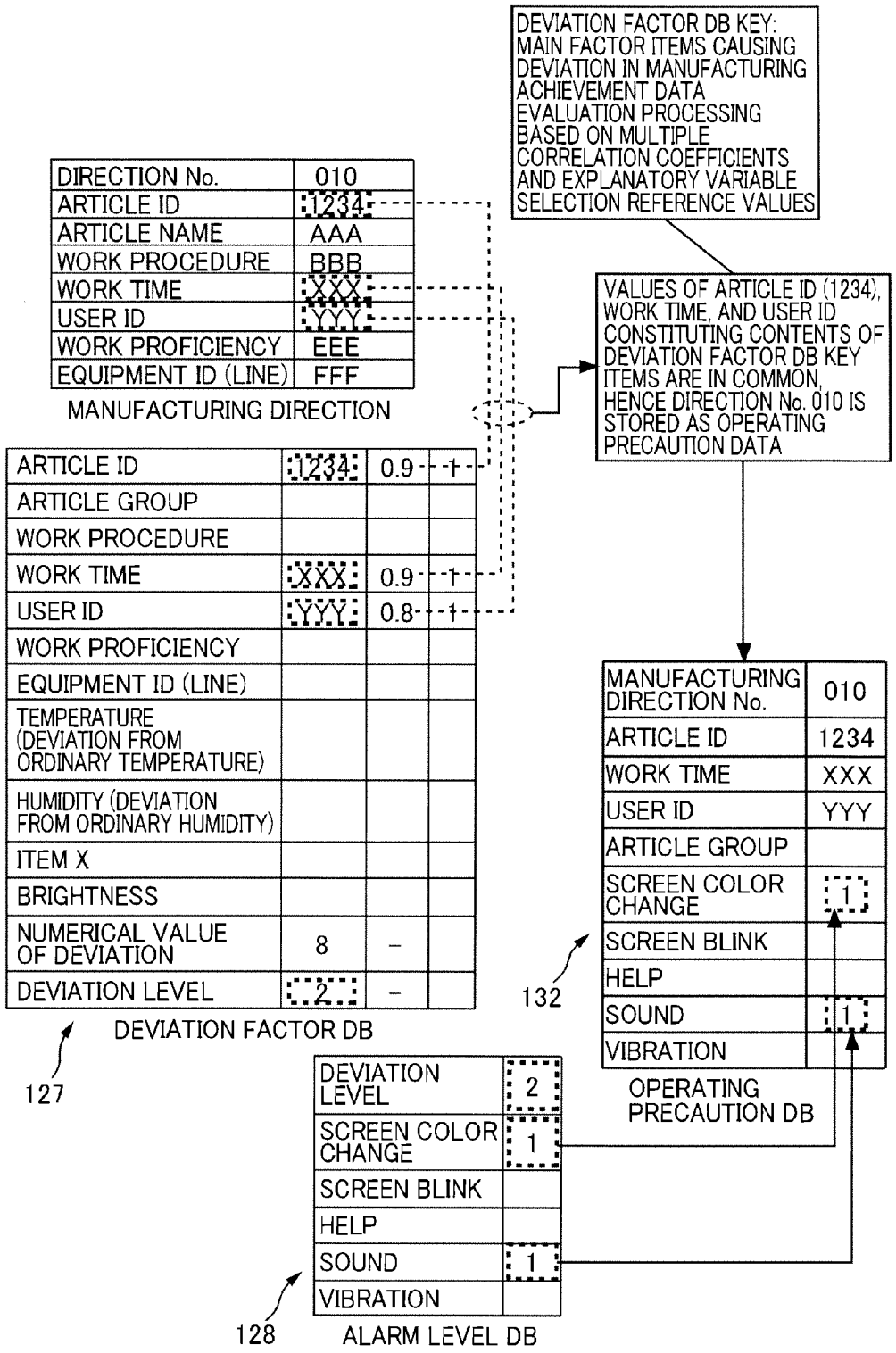
FIG. 20 is a first explanatory diagram associated with the process flow example 3 according to the present embodiment.

When the parameters of the new manufacturing direction No. "010" match the manufacturing direction parameters associated with the information on the optimum parameters in any of the groups of manufacturing direction parameters in the deviation factor database 127 (s301: matching), the alarm specification part 113 extracts the information on the deviation (the information on the deviation and/or the deviation level) associated with the matched group of manufacturing directions in the deviation factor database 127 (s302). In the example shown in FIG. 20, some of the manufacturing direction parameters of the manufacturing direction No. "010," namely, the article ID "1234," the work time "XXX," and the user ID "YYY" turn out to match the optimum parameters for the article ID "1234" in the data stored in the deviation factor database 127. Hence the value of the deviation "8" and the deviation level "2" are obtained as information on the deviation.

On the other hand, the alarm specification part 113 terminates the flow if the parameters of the new manufacturing direction do not match the manufacturing direction parameters associated with the information on the optimum parameters in any of the groups of manufacturing direction parameters in the deviation factor database 127 (s301: not matching).

The alarm specification part 113 checks the information on the deviation extracted in the step s302 against the alarm level database 128 and specifies the alarm information corresponding to the deviation and the deviation level (s303). For example, the information on the deviation extracted in the step s302 is assumed to represent the deviation level and the deviation level is assumed to indicate "2." In this case, the alarm specification part 113 can specify the respective flags "1" for "screen color change" and "sound" as the alarm information by checking the deviation level "2" against the alarm level database 128. The alarm specification part 113 stores the alarm information in the operating precaution database 132 in association with the manufacturing direction No. representing the new manufacturing direction (s304). The alarm specification part 113 stores the optimum parameters applicable to this case, namely, the "article ID," the "work time," and the "user ID," as well as the alarm information in the operating precaution database 132 while using the manufacturing direction No. "010" as the key.

Thereafter, a situation when the manufacturing process is executed on the manufacturing line in response to the manufacturing direction No. "010" is estimated. At this time, the operation processing part 114 of the system 100 receives input of information to designate a manufacturing direction by a manufacturing line manager or the like, i.e., the manufacturing direction No. "010," with the input device 105 such as a keyboard, for instance (s305).

Figure 21:
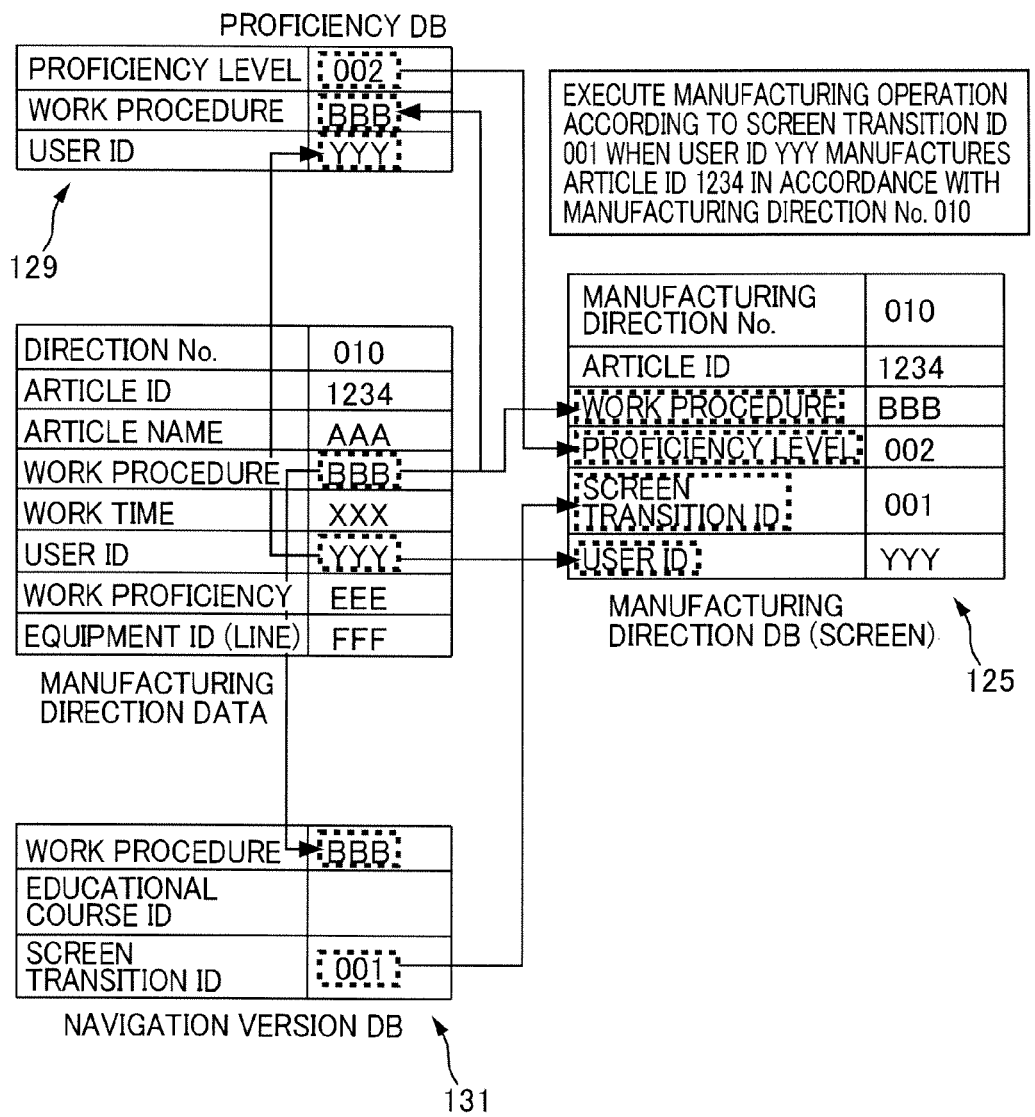
FIG. 21 is a second explanatory diagram associated with the process flow example 3 according to the present embodiment.

The operation processing part 114 reads the manufacturing direction data corresponding to the designated information "010" from the manufacturing direction database 125 and extracts the information on the work procedure indicated by the group of the manufacturing direction parameters of the applicable manufacturing direction (s306). In the example of FIG. 21, the manufacturing direction No. "010" includes the value "BBB" as the value of the manufacturing direction parameter indicating the work procedure. Accordingly, the operation processing part 114 extracts the value "BBB" as the information on the work procedure.

Based on the value "BBB" representing the information on the work procedure, the operation processing part 114 reads a screen transition ID "001" as shown in FIG. 21, for example, as output data associated with the work procedure "BBB" from the navigation version database 131 in the storage device 101 (s307). Moreover, the operation processing part 114 stores the information on the screen transition ID "001" in the manufacturing direction database 125 in association with the manufacturing direction No. "010" (s308).

Subsequently, the operation processing part 114 reads the information on the screen transition ID "001" from the manufacturing direction database 125 for the manufacturing direction "010" and reads output data that is a group of screen data corresponding to the screen transition ID "001" (and the work procedure "BBB") from the navigation version database 131 (see FIG. 9) (s309). Naturally, the screen data for each screen transition ID are stored in advance in the navigation version database 131 as exemplified in FIG. 5. Moreover, the operation processing part 114 reads the alarm information from the operating precaution database 132 for the manufacturing direction No. "010." Then, the operation processing part 114 replaces all or part of the output data with the alarm information and outputs the alarm information to the output device 106. Alternatively, the operation processing part 114 outputs the alarm information together with the output data to the output device 106 such as a display device or a speaker installed on the manufacturing line or the like (s310).

For example, when the "output data" represents the screen data and the "alarm information" represents "screen color change," the operation processing part 114 performs processing to highlight a certain prescribed region (e.g., a region for displaying the manufacturing direction parameters including the article, the quantity, the temperature, and the like) in the screen data in a prescribed color (e.g., in red for the prescribed region in contrast to black for indicating characters and lines in other regions) and outputs the processed data to the output device 106 (see a screen 1000 in FIG. 22). Meanwhile, when the "alarm information" represents "blink," the operation processing part 114 performs processing to blink a certain prescribed region (e.g., the region for displaying the manufacturing direction parameters including the article, the quantity, the temperature, and the like) in the screen data and outputs the processed data to the output device 106 (see a screen 1010 in FIG. 22).

Meanwhile, when the "alarm information" represents "help," the operation processing part 114 performs pop-up processing to display an advisory message to a worker in a certain prescribed region (e.g., the region for displaying the manufacturing direction parameters including the article, the quantity, the temperature, and the like) in the screen data and outputs the processed data to the output device 106 (see a screen 1020 in FIG. 22).

Meanwhile, when the "alarm information" represents "sound," the operation processing part 114 reads sound data for an advisory message to a worker corresponding to the work procedure from the navigation version database 131 (see FIG. 9) upon output of the screen data and outputs the sound through the speaker.

Example 4 of Procedures

Figure 23:
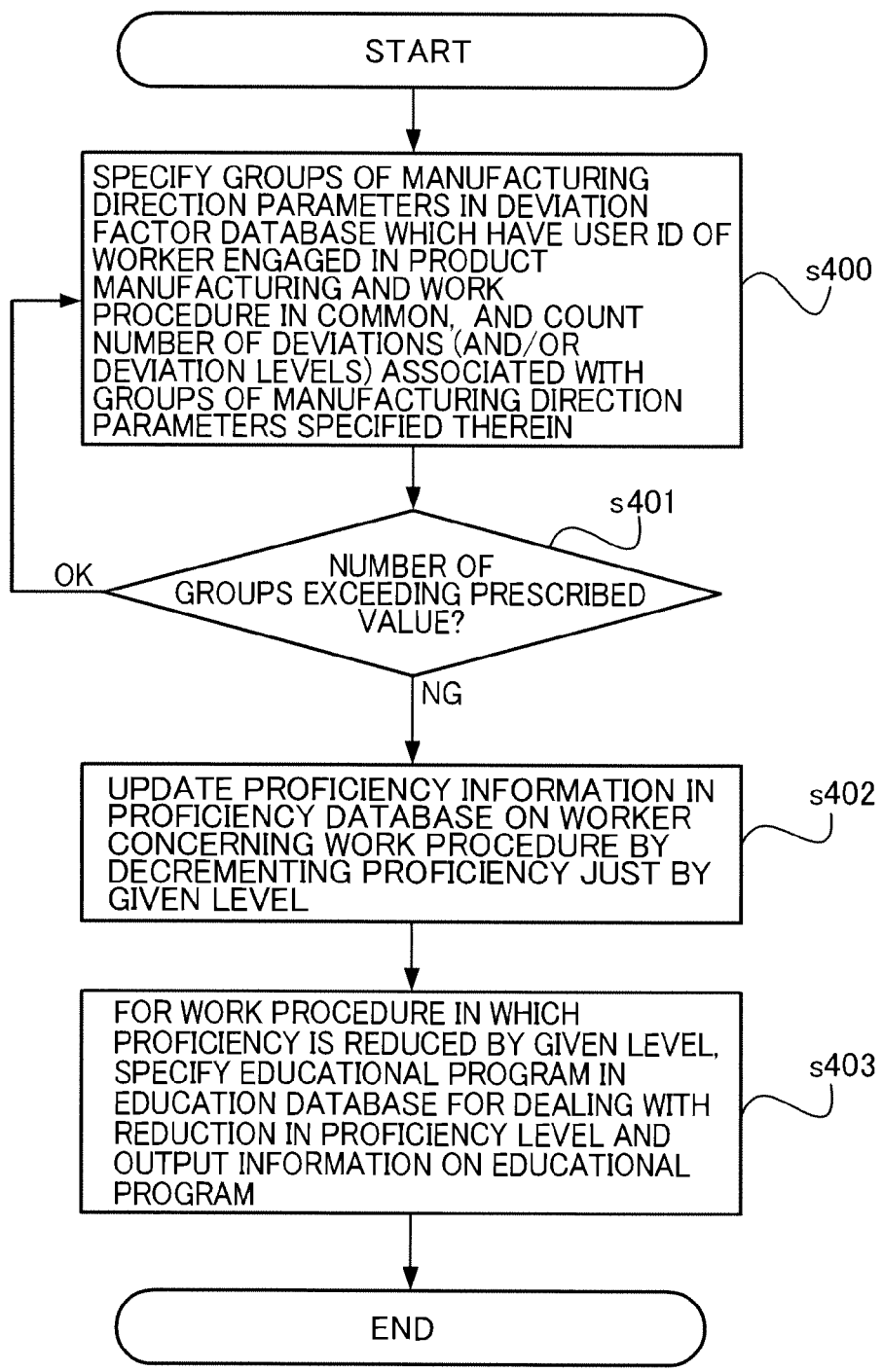
FIG. 23 is a diagram showing a process flow example 4 of the work support method according to the present embodiment.

FIG. 23 is a diagram showing a process flow example 4 of the work support method according to the present embodiment. Here, description will be provided for processing for monitoring a situation of a worker working on the manufacturing line as to whether the worker causes a deviation at a predetermined level or greater between the manufacturing direction and the manufacturing achievement and for taking action on the worker depending on the situation. In this case, data on the deviation caused by each worker in a work performed in accordance with each manufacturing direction is accumulated in a relevant record (a record corresponding to the manufacturing direction) in the deviation factor database 127 every time the work is completed.

At this time, the proficiency change part 115 of the system 100 specifies the groups of manufacturing direction parameters (a set of information on the direction achievement and deviations obtained for a certain manufacturing direction) in the deviation factor database 127, namely, the groups which have the same user ID "DDD" of the worker engaged in product manufacturing and the work procedure "BBB". Then the proficiency change part 115 counts the number of the deviations (or the deviation levels) associated with the specified groups of manufacturing direction parameters and having values equal to or greater than a predetermined value (s400). In this case, the proficiency change part 115 counts the number of groups of manufacturing direction parameters in the deviation factor database 127, which are associated with the information on the deviation level "2" or greater (i.e., the groups having the deviation equal to or greater than level 2), for example.

The proficiency change part 115 judges whether or not the number of the groups having the deviation level equal to or greater than the predetermined value, which are counted in the step s400, exceeds a prescribed value (s401). When the number exceeds the prescribed value (s401: N), the proficiency change part 115 updates information of the worker "DDD" for the work procedure "BBB" in the proficiency database 129 with information indicating the proficiency reduced just by a given level (such as one level) (s402). On the other hand, the proficiency change part 115 returns the processing to the step s400 when the number of groups does not exceed the prescribed value (s401: Y).

Meanwhile, for the work procedure "BBB" in which the proficiency is reduced by the given level, the educational content specification part 116 of the system 100 specifies an educational program in the educational database 130 according to reduction in the proficiency level and outputs the information on the educational program to the output device 106 (s403). For example, for the work procedure "BBB" in which the proficiency level is reduced by one level from "002" to "001," the educational content specification part 116 specifies an educational program "ED001B" corresponding to the proficiency level "001" in the education database 130, and outputs the information on the educational program to the output device 106 such as the display device or the speaker. By performing this processing, a manufacturing process manager or the worker oneself is able to recognize the information on the educational program outputted to the output device 106 and to receive education again for the work procedure in which the proficiency is reduced.

As described above, according to the present invention, the content of an operating instruction to each worker in a manufacturing process can be controlled based on a manufacturing direction to the worker and on manufacturing achievement, work proficiency, and the like of the worker for the manufacturing direction.

While the present invention has been concretely described above on the basis of the embodiment, it is to be understood that the present invention is not limited only to the embodiment and that various modifications are possible without departing from the spirit and scope of the invention.

What is claimed is:

1. A work support system comprising:
a storage device configured to store a manufacturing direction database storing a manufacturing direction parameter generated in product manufacturing, a direction achievement database storing manufacturing achievement data of a manufacturing process performed in accordance with the manufacturing direction parameter, an alarm level database defining alarm information to be given to a worker on a manufacturing line depending on the size of a deviation between manufacturing direction and the manufacturing achievement, and a multiple regression analysis program to execute a multiple regression analysis;
a data reading part configured to read a group of manufacturing direction parameters and the manufacturing achievement data corresponding to the group of manufacturing direction parameters from the manufacturing direction database and the direction achievement database, to calculate a deviation between a given target value indicated by the group of manufacturing direction parameters and a given achievement value indicated by the manufacturing achievement data, and to store the group of manufacturing direction parameters and the deviation into a deviation factor database in the storage device;
a candidate selection part configured to calculate risk rates of all parameters included in the group of manufacturing direction parameters and calculate an average value of the calculated risk rates of the parameters in accordance with the multiple regression analysis program using the group of manufacturing direction parameters in the deviation factor database as explanatory variables and using the deviation as an objective variable, and to specify a manufacturing direction parameter having the risk rate equal to or below the average value as a selection candidate;
a parameter specification part configured to calculate a multiple correlation coefficient, the number of parameters, and the number of samples for each of the group of manufacturing direction parameters and the manufacturing direction parameter of the selection candidate, to calculate an explanatory variable selection reference value, in accordance with the multiple regression analysis program, based on the multiple correlation coefficient, the number of parameters, and the number of samples thus calculated, to specify, as optimum parameters, one of the group of manufacturing direction parameters and the manufacturing direction parameter of the selection candidate that has the largest explanatory variable selection reference value, and to store information on the optimum parameters in the deviation factor database in association with the specified manufacturing direction parameters;
an alarm specification part configured to check parameters included in a manufacturing direction newly stored in the manufacturing direction database against the deviation factor database, when the parameters of the new manufacturing direction match the manufacturing direction parameters associated with the information on the optimum parameters in the deviation factor database, to extract information on the deviation associated with the group of the matched manufacturing direction parameters in the deviation factor database, to check the information on the deviation against the alarm level database to specify alarm information corresponding to the deviation, and to store the alarm information in the storage device in association with the new manufacturing direction; and an operation processing part configured to receive designation information for a manufacturing direction through an input device, to read the manufacturing direction corresponding to the designation information from the manufacturing direction database, to read output data associated with a work procedure indicated by the group of parameters in the manufacturing direction, from the storage device based on information on the work procedure, to read the alarm information stored for the manufacturing direction from the storage device, and to perform any of an operation of replacing all or part of the output data with the alarm information and outputting the resultant data to the output device and an operation of outputting the alarm information to the output device together with the output data.

2. The work support system according to claim 1, wherein the storage device stores a proficiency database storing proficiency information on each work procedure for each worker engaged in product manufacturing, and an education database storing information on an educational program to be taken by a worker according to a change in proficiency in a work procedure, and the system comprises:

a proficiency change part configured to specify the groups of manufacturing direction parameters in the deviation factor database having same manufacturing direction parameters indicating identification information on a worker engaged in product manufacturing and a work procedure, and to update proficiency information of the worker for the work procedure with information indicating proficiency reduced just by a predetermined level in the proficiency database when the number of deviations associated with the specified groups of manufacturing direction parameters and having values equal to or above a prescribed value exceeds a prescribed value; and an educational content specification part configured to specify, for the work procedure for which the proficiency is reduced by the predetermined level, the educational program corresponding to the reduction in the proficiency level in the education database, and to output information on the educational program to the output device.

3. A work support method to be executed by a computer system including a storage device configured to store a manufacturing direction database storing a manufacturing direction parameter generated in product manufacturing, a direction achievement database storing manufacturing achievement data of a manufacturing process performed in accordance with the manufacturing direction parameter, an alarm level database defining alarm information to be given to a worker on a manufacturing line depending on the size of a deviation between manufacturing direction and the manufacturing achievement, and a multiple regression analysis program to execute a multiple regression analysis, the method comprising:

processing to read a group of manufacturing direction parameters and the manufacturing achievement data corresponding to the group of manufacturing direction parameters from the manufacturing direction database and the direction achievement database, to calculate a deviation between a given target value indicated by the group of manufacturing direction parameters and a given achievement value indicated by the manufacturing achievement data, and to store the group of manufacturing direction parameters and the deviation into a deviation factor database in the storage device;

processing to calculate risk rates of all parameters included in the group of manufacturing direction parameters and calculate an average value of the calculated risk rates of the parameters in accordance with the multiple regression analysis program using the group of manufacturing direction parameters in the deviation factor database as explanatory variables and using the deviation as an objective variable, and to specify a manufacturing direction parameter having the risk rate equal to or below the average value as a selection candidate;

processing to calculate a multiple correlation coefficient, the number of parameters, and the number of samples for each of the group of manufacturing direction parameters and the manufacturing direction parameter of the selection candidate, to calculate an explanatory variable selection reference value, in accordance with the multiple regression analysis program, based on the multiple correlation coefficient, the number of parameters, and the number of samples thus calculated, to specify, as optimum parameters, one of the group of manufacturing direction parameters and the manufacturing direction parameter of the selection candidate that has the largest explanatory variable selection reference value, and to store information on the optimum parameters in the deviation factor database in association with the specified manufacturing direction parameters;

processing to check parameters included in a manufacturing direction newly stored in the manufacturing direction database against the deviation factor database, when the parameters of the new manufacturing direction match the manufacturing direction parameters associated with the information on the optimum parameters in the deviation factor database, to extract information on the deviation associated with the group of the matched manufacturing direction parameters in the deviation factor database, to check the information on the deviation against the alarm level database to specify alarm information corresponding to the deviation, and to store the alarm information in the storage device in association with the new manufacturing direction; and processing to receive designation information for a manufacturing direction through an input device, to read the manufacturing direction corresponding to the designation information from the manufacturing direction database, to read output data associated with a work procedure indicated by the group of parameters in the manufacturing direction, from the storage device based on information on the work procedure, to read the alarm information stored for the manufacturing direction from the storage device, and to perform any of an operation of replacing all or part of the output data with the alarm information and outputting the resultant data to the output device and an operation of outputting the alarm information to the output device together with the output data.

4. A storage medium storing therein a program executable by a computer system including a storage device configured to store a manufacturing direction database storing a manufacturing direction parameter generated in product manufacturing, a direction achievement database storing manufacturing achievement data of a manufacturing process performed in accordance with the manufacturing direction parameter, an alarm level database defining alarm information to be given to a worker on a manufacturing line depending on the size of a deviation between manufacturing direction and the manufacturing achievement, and a multiple regression analysis program to execute a multiple regression analysis, the program causing the computer system to execute:

processing to read a group of manufacturing direction parameters and the manufacturing achievement data corresponding to the group of manufacturing direction parameters from the manufacturing direction database and the direction achievement database, to calculate a deviation between a given target value indicated by the group of manufacturing direction parameters and a given achievement value indicated by the manufacturing achievement data, and to store the group of manufacturing direction parameters and the deviation into a deviation factor database in the storage device;

processing to calculate risk rates of all parameters included in the group of manufacturing direction parameters and calculate an average value of the calculated risk rates of the parameters in accordance with the multiple regression analysis program using the group of manufacturing direction parameters in the deviation factor database as explanatory variables and using the deviation as an objective variable, and to specify a manufacturing direction parameter having the risk rate equal to or below the average value as a selection candidate;

processing to calculate a multiple correlation coefficient, the number of parameters, and the number of samples for each of the group of manufacturing direction parameters and the manufacturing direction parameter of the selection candidate, to calculate an explanatory variable selection reference value, in accordance with the multiple regression analysis program, based on the multiple correlation coefficient, the number of parameters, and the number of samples thus calculated, to specify, as optimum parameters, one of the group of manufacturing direction parameters and the manufacturing direction parameter of the selection candidate that has the largest explanatory variable selection reference value, and to store information on the optimum parameters in the deviation factor database in association with the specified manufacturing direction parameters;

processing to check parameters included in a manufacturing direction newly stored in the manufacturing direction database against the deviation factor database, when the parameters of the new manufacturing direction match the manufacturing direction parameters associated with the information on the optimum parameters in the deviation factor database, to extract information on the deviation associated with the group of the matched manufacturing direction parameters in the deviation factor database, to check the information on the deviation against the alarm level database to specify alarm information corresponding to the deviation, and to store the alarm information in the storage device in association with the new manufacturing direction; and processing to receive designation information for a manufacturing direction through an input device, to read the manufacturing direction corresponding to the designation information from the manufacturing direction database, to read output data associated with a work procedure indicated by the group of parameters in the manufacturing direction, from the storage device based on information on the work procedure, to read the alarm information stored for the manufacturing direction from the storage device, and to perform any of an operation of replacing all or part of the output data with the alarm information and outputting the resultant data to the output device and an operation of outputting the alarm information to the output device together with the output data.

* * * * *